United States Patent
Funayama

(10) Patent No.: US 9,019,660 B2
(45) Date of Patent: Apr. 28, 2015

(54) MAGNETIC RECORDING HEAD WITH SPIN TORQUE OSCILLATOR HAVING INVERTED CURRENT SUPPLY CIRCUIT

(71) Applicant: Kabushiki Kaisha Toshiba, Minato-ku, Tokyo (JP)

(72) Inventor: Tomomi Funayama, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/828,222

(22) Filed: Mar. 14, 2013

(65) Prior Publication Data

US 2014/0118861 A1 May 1, 2014

(30) Foreign Application Priority Data

Oct. 26, 2012 (JP) ................. 2012-236947

(51) Int. Cl.
G11B 5/127 (2006.01)
G11B 5/31 (2006.01)
G11B 5/00 (2006.01)

(52) U.S. Cl.
CPC .............. *G11B 5/1278* (2013.01); *G11B 5/314* (2013.01); *G11B 2005/0024* (2013.01)

(58) Field of Classification Search
CPC ................ G11B 2005/0024; G11B 5/1278
USPC ............. 360/125.3, 125.31, 125.71, 125.74
See application file for complete search history.

(56) References Cited

U.S. PATENT DOCUMENTS

| | | | |
|---|---|---|---|
| 7,791,829 B2 | 9/2010 | Takeo et al. | |
| 8,027,118 B2 | 9/2011 | Ezawa et al. | |
| 8,116,032 B2 * | 2/2012 | Contreras et al. | 360/123.02 |
| 8,643,972 B2 * | 2/2014 | Shiroishi et al. | 360/59 |
| 2009/0052095 A1* | 2/2009 | Yamada et al. | 360/324 |
| 2009/0059417 A1* | 3/2009 | Takeo et al. | 360/75 |
| 2010/0232053 A1* | 9/2010 | Yano et al. | 360/75 |
| 2010/0254042 A1* | 10/2010 | Contreras et al. | 360/123.05 |
| 2011/0128648 A1* | 6/2011 | Ezawa et al. | 360/75 |
| 2012/0092787 A1* | 4/2012 | Koizumi | 360/31 |
| 2012/0113542 A1 | 5/2012 | Igarashi et al. | |
| 2012/0307404 A1* | 12/2012 | Braganca et al. | 360/245.8 |
| 2013/0050865 A1* | 2/2013 | Katada et al. | 360/31 |
| 2013/0050866 A1* | 2/2013 | Matsubara et al. | 360/31 |

FOREIGN PATENT DOCUMENTS

| | | |
|---|---|---|
| JP | 2009-064499 | 3/2009 |
| JP | 4358279 | 8/2009 |
| JP | 2011-113621 | 6/2011 |
| JP | 2012-053950 | 3/2012 |
| JP | 2012-104168 | 5/2012 |

* cited by examiner

*Primary Examiner* — Adam B Dravininkas
(74) *Attorney, Agent, or Firm* — Knobbe Martens Olson & Bear LLP

(57) ABSTRACT

According to one embodiment, a magnetic recording head includes a main magnetic pole configured to apply a recording magnetic field to a recording layer of a recording medium, a spin torque oscillator adjacent to the main magnetic pole in a vicinity of a disk-facing surface confronting the recording medium, a recording coil configured to excite the main magnetic pole, a recording current control circuit configured to supply a recording current to the recording coil, a constant current supply circuit configured to supply a constant current to the spin torque oscillator, and an inverted current supply circuit configured to supply an inverted current having a polarity different from the constant current to the spin torque oscillator.

9 Claims, 5 Drawing Sheets

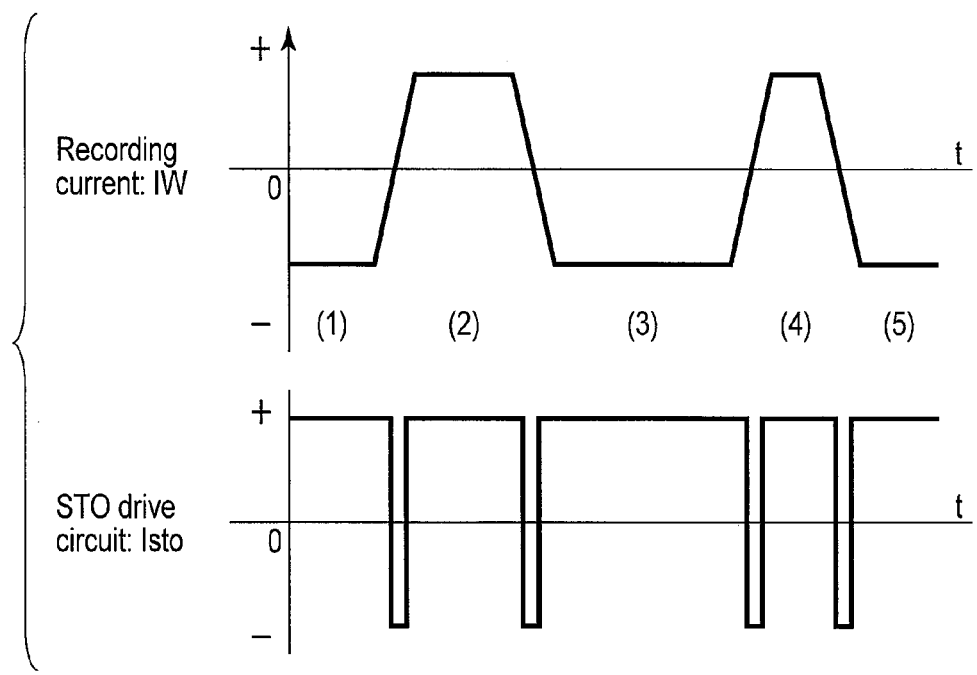
F I G. 5
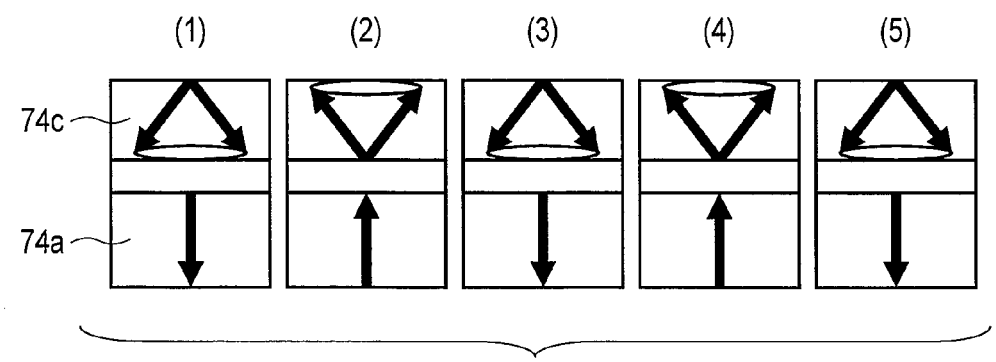
F I G. 6

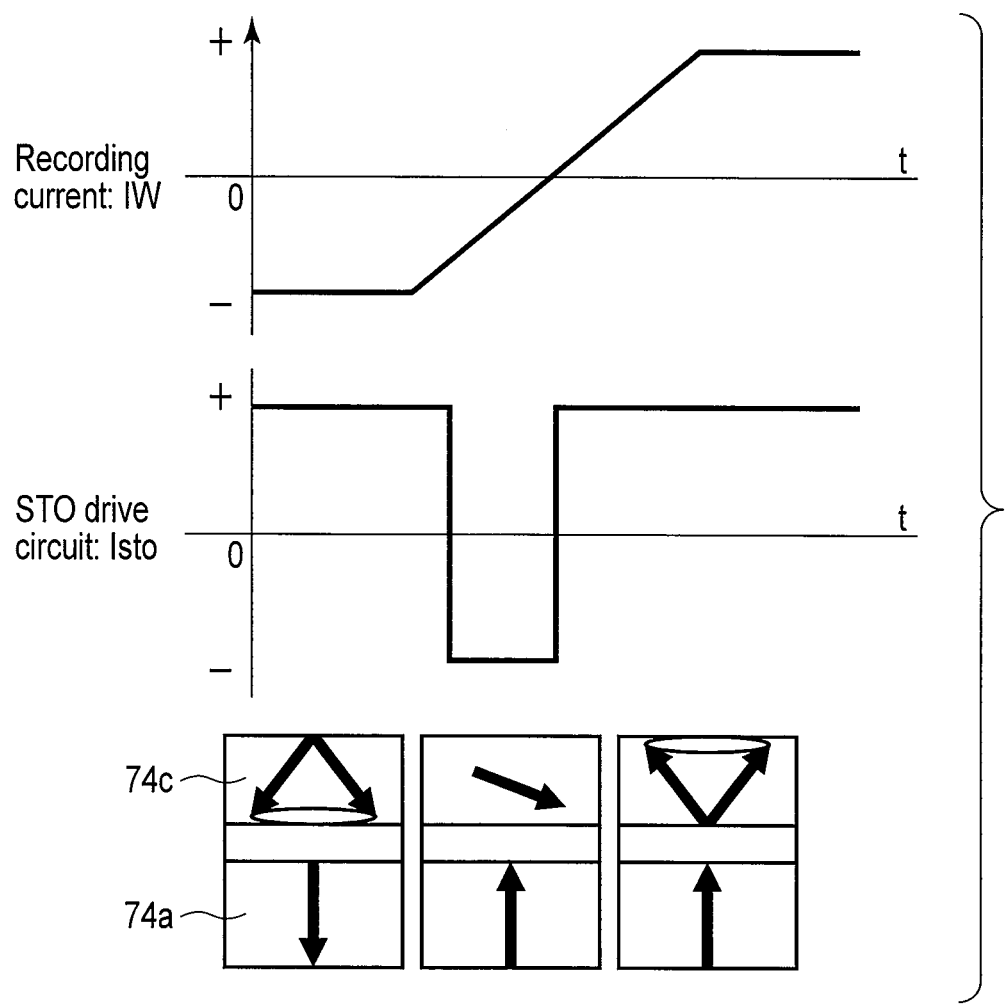
F I G. 7

MAGNETIC RECORDING HEAD WITH SPIN TORQUE OSCILLATOR HAVING INVERTED CURRENT SUPPLY CIRCUIT

CROSS-REFERENCE TO RELATED APPLICATIONS

This application is based upon and claims the benefit of priority from Japanese Patent Application No. 2012-236947, filed Oct. 26, 2012, the entire contents of which are incorporated herein by reference.

FIELD

Embodiments described herein relate generally to a magnetic recording head used to a disk apparatus and a disk apparatus including the same.

BACKGROUND

As a disk apparatus, for example, a magnetic disk apparatus includes a magnetic disk arranged in a case, a spindle motor for supporting and rotating the magnetic disk, a magnetic head for reading/writing information from and to the magnetic disk, and a carriage assembly for movably supporting the magnetic head to the magnetic disk. A head section of the magnetic head includes a recording head for writing and a read head for reading.

Recently, a recording head making use of perpendicular magnetic recording has been proposed to increase recording density and the capacity of a magnetic disk device or to reduce the size of the magnetic disk device. In the magnetic head, the recording head has a main magnetic pole for producing a perpendicular magnetic field, a trailing shield opposed to a trailing side of the main magnetic pole with a write gap therebetween, and a coil for directing magnetic flux to the main magnetic pole.

To improve the recording density, there has been proposed a magnetic head employing a high-frequency magnetic field assist record system that includes a spin torque oscillator as a high-frequency oscillator interposed between a main magnetic pole and a trailing shield and applies a high-frequency magnetic field from the spin torque oscillator to a magnetic recording layer. It becomes possible to produce a large high-frequency magnetic field and to realize stable read/write characteristics by supplying a drive current to the high-frequency oscillator and oscillating a magnetization of an oscillation layer in a sufficient amount of amplitude.

The spin torque oscillator employs a spin injection layer having a coercive force smaller than a magnetic field applied from the main magnetic pole. With the configuration, since the direction of a recording magnetic field and the magnetization direction of the spin injection layer become the same at all times, stable oscillation can be obtained. However, in the spin torque oscillator constructed as described above, there is a problem in that the spin torque oscillator cannot employ a spin injection layer having a coercive force larger than a magnetic field applied from a main magnetic pole.

Further, magnetization reversal of the spin injection layer is executed by a gap magnetic field of a write head. Accordingly, even if a magnetization reversal speed of the spin injection layer is increased, the magnetization reversal of the spin injection layer inevitably occurs with a time lag from a reversal of the gap magnetic field, with a result that it is difficult to improve speed responsiveness of the magnetization reversal.

BRIEF DESCRIPTION OF THE DRAWINGS

FIG. 5 is a view schematically illustrating a recording current supplied to a magnetic recording head and a drive current of a spin torque oscillator in a magnetic disk apparatus according to a second embodiment;

FIG. 6 is view schematically illustrating a change of a magnetization direction in a spin injection layer and an oscillation layer of the spin torque oscillator;

FIG. 7 is a view illustrating the recording current and the drive current of the spin torque oscillator in comparison with a magnetization direction in the spin injection layer and the oscillation layer.

DETAILED DESCRIPTION

Various embodiments will be described hereinafter with reference to the accompanying drawings. In general, according to one embodiment, a magnetic recording head comprises a main magnetic pole configured to apply a recording magnetic field to a recording layer of a recording medium; a spin torque oscillator adjacent to the main magnetic pole in a vicinity of a disk-facing surface confronting the recording medium; a recording coil configured to excite the main magnetic pole; a recording current control circuit configured to supply a recording current to the recording coil; a constant current supply circuit configured to supply a constant current to the spin torque oscillator; and an inverted current supply circuit configured to supply an inverted current having a polarity different from the constant current to the spin torque oscillator.

(First Embodiment)

Figure 1:
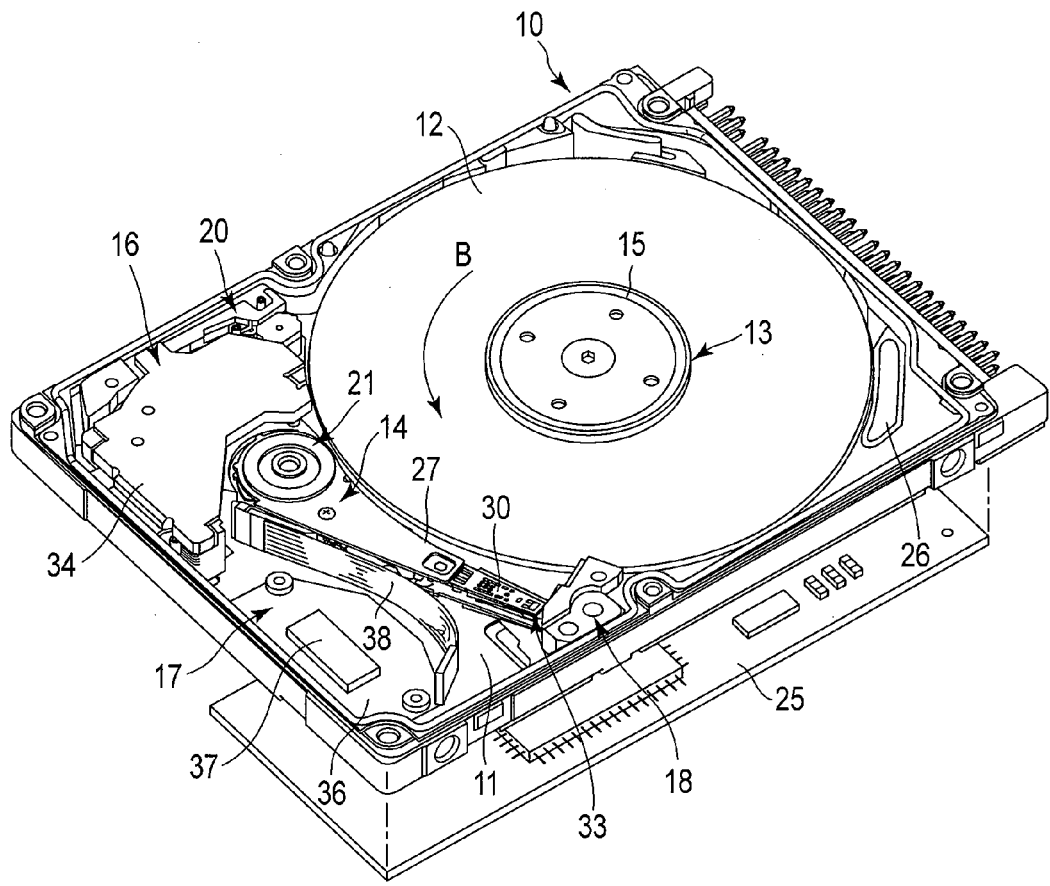
FIG. 1 is a perspective view illustrating a magnetic disk apparatus (HDD) according to a first embodiment.
Figure 2:
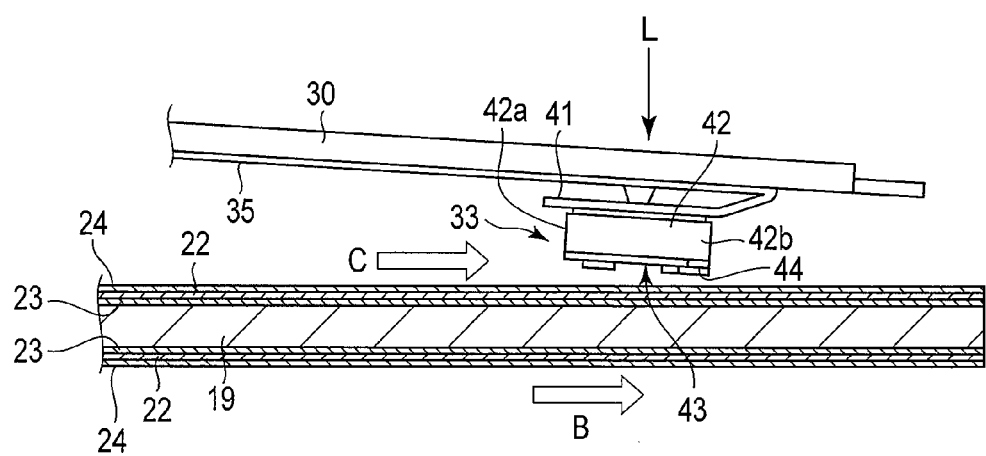
FIG. 2 is side view illustrating a magnetic head, a suspension, and a recording medium in the HDD.

FIG. 1 shows an internal structure of a hard disk drive (HDD) according to a first embodiment as a disk apparatus by removing a top cover of the HDD, and FIG. 2 illustrates a magnetic head in a floating state. As shown in FIG. 1, the HDD comprises a case 10. The case 10 comprises a rectangular box-shaped base 11 having an upper opening and a not illustrated rectangular sheet-shaped top cover. The top cover is secured to the base by a plurality of screws and closes the upper opening of the base. With the configuration, the inside of the case 10 is kept to air tight and can communicate with the outside atmosphere only via a breathing filter 26.

A magnetic disk 12 as a recording medium and a drive unit are disposed on the base 11. The drive unit comprises a spindle motor 13 for supporting and rotating the magnetic disk 12, plural, for example, two magnetic heads 33 for reading data from and writing data to the magnetic disk, a head actuator 14 for movably supporting the magnetic heads 33 with respect to a surface of the magnetic disk 12, and a voice coil motor (VCM) 16 that rotates and positions the head actuator. Further, disposed on the base 11 are a ramp load mechanism 18 for holding the magnetic heads 33 at a position away from the magnetic disk 12 when the magnetic heads 33 move to the outermost periphery of the magnetic disk 12, an inertia latch 20 for holding the head actuator 14 at an evacuation position when a shock and the like act on the HDD, and a substrate unit 17 on which electronic parts such as a preamplifier, a head IC, and the like are mounted.

A control circuit board 25 is secured by screws to an outer surface of the base 11 and opposed to a bottom wall of the base 11. The control circuit board 25 controls an operation of the spindle motor 13, the VCM 16, and the magnetic heads 33 via the substrate unit 17.

As shown in FIG. 1 and FIG. 2, the magnetic disk 12 is configured as a perpendicular magnetic recording medium. The magnetic disk 12 is formed in a disk-shape having a diameter of, for example, about 2.5 inches and has a substrate 19 composed of a nonmagnetic body. On respective surfaces of the substrate 19, a soft magnetic layer 23 as an under layer and a perpendicular magnetic recording layer 22, which has a magnetic anisotropy in a direction perpendicular to a disk surface and is formed on an upper layer portion of the soft magnetic layer 23, are sequentially laminated and further a protective film 24 is further formed on the perpendicular magnetic recording layer 22.

As shown in FIG. 1 the magnetic disk 12 is coaxially engaged with a hub of the spindle motor 13 each other as well as clamped by a clamp spring 15 secured to an upper end of the hub by a screw and secured to the hub. The magnetic disk 12 is rotated by the spindle motor 13 as a drive motor in an arrow B direction at a predetermined speed.

As shown in FIG. 1 and FIG. 2, the head actuator 14 comprises a bearing unit 21 secured on the bottom wall of the base 11 and a plurality of arms 27 extending from the bearing unit. The arms 27 are positioned parallel to the surface of the magnetic disk 12 at a predetermined interval from each other as well as extend in the same direction from the bearing unit 21. The head actuator 14 includes elastically deformable slender sheet-like suspensions 30. Each of the suspensions 30 is composed of a sheet spring whose base end is secured to an extreme end of each of the arms 27 by spot welding or bonding and extends from the arm. Extending ends of the respective suspensions 30 are supported by the magnetic heads 33 via a gimbal spring 41. A head gimbal assembly is configured by the suspensions 30, the gimbal spring 41, and the magnetic heads 33. Note that the head actuator 14 may be configured to include a so-called E block in which a sleeve of the bearing unit 21 and the plurality of arms are formed integrally.

As illustrated in FIG. 2, each magnetic head 33 comprises an approximately rectangular parallelepiped slider 42 and a read/write head section 44 disposed on the outflow end (trailing end) of the slider 42. The respective magnetic heads 33 are applied with a head load L directed to the surface of the magnetic disk 12 by elasticity of the suspensions 30. The two arms 27 are positioned parallel to each other at a predetermined interval, and the suspensions 30 and the magnetic heads 33 attached to the arms confront each other interposing the magnetic disk 12 therebetween.

The respective magnetic heads 33 are electrically connected to a main FPC 38 to be described later via the suspensions 30 and relay flexible printed circuit boards (relay FPCs) 35 secured on the arms 27.

As shown in FIG. 1, the substrate unit 17 has an FPC main body 36 formed of a flexible printed circuit board and the main FPC 38 extending from the FPC main body. The FPC main body 36 is secured on a bottom surface of the base 11. Electronic parts including a preamplifier 37 and a head IC are mounted on the FPC main body 36. An extending end of the main FPC 38 is connected to the head actuator 14 and connected to the magnetic heads 33 via the respective relay FPCs 35.

The VCM 16 comprises a not illustrated support frame extending from the bearing unit 21 in a direction opposite to the arms 27 and a voice coil supported by the support frame. In a state in which the head actuator 14 is assembled to the base 11, the voice coil is positioned between a pair of yokes 34 secured on the base 11 and constitutes the VCM 16 together with the yokes and magnets secured to the yokes.

In a state that the magnetic disk 12 rotates, the head actuator 14 is turned by energizing the voice coil of the VCM 16, and the magnetic heads 33 are moved onto a desired track of the magnetic disk 12 and positioned. At the time, the magnetic heads 33 are moved between an inner peripheral edge portion and an outer peripheral edge portion of the magnetic disk 12 along a radial direction of the magnetic disk.

Figure 3:
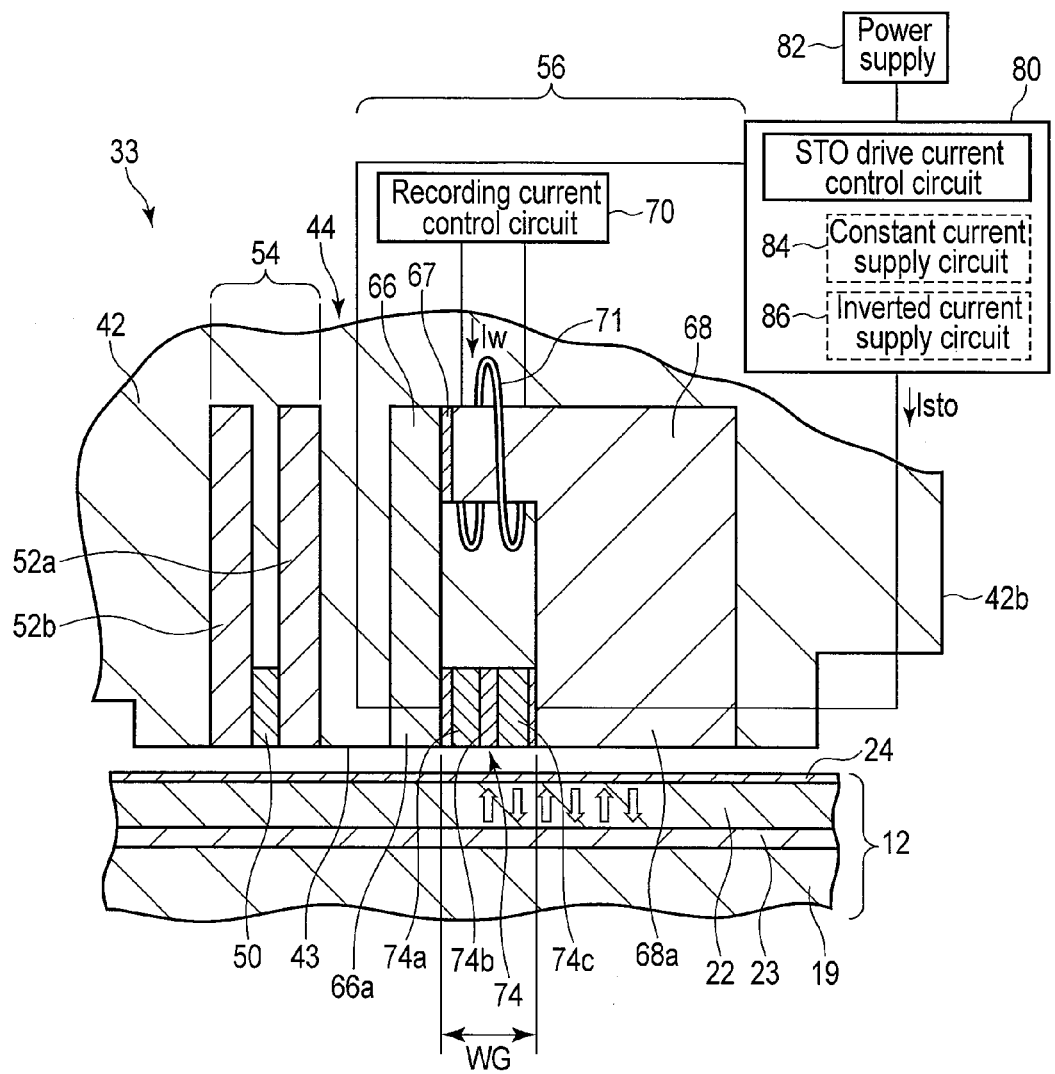
FIG. 3 is a sectional view briefly illustrating a head unit of the magnetic head and a part of a magnetic disk in enlargement.

Next, a configuration of the magnetic heads 33 will be explained in detail. FIG. 3 is a sectional view showing the head section 44 of each magnetic head 33 and a part of the magnetic disk in enlargement.

As illustrated in FIG. 2 and FIG. 3, the magnetic head 33 is configured as a flying-type head and comprises the slider 42 formed in the approximately rectangular parallelepiped and the head section 44 formed on the outflow end (trailing) side of the slider. The slider 42 is formed of, for example, a sintered body (AlTiC) of alumina and titanium carbide, and the head unit 44 is formed of a plurality of thin film layers.

The slider 42 has a rectangular disk-facing surface (air bearing surface (ABS)) 43 confronting the surface of the magnetic disk 12. The slider 42 is caused to fly from the surface of the magnetic disk a predetermined amount by an airflow C produced between the surface of the disk and the disk-facing surface 43 by the rotation of the magnetic disk 12. The direction of the airflow C is coincident with the rotating direction B of the magnetic disk 12. The slider 42 is disposed so that a longitudinal direction of the disk-facing surface 43 approximately agrees with the direction of the airflow C with respect to the surface of the magnetic disk 12.

The slider 42 comprises leading and trailing ends 42a and 42b on the inflow and outflow sides, respectively, of airflow C. The ABS 43 of the slider 42 is formed with leading and trailing steps, side steps, negative-pressure cavity, etc., which are not shown.

As shown in FIG. 3, the head section 44 is constructed as a dual-element magnetic head, comprising a read head 54 and recording head 56 formed on the trailing end 42b of the slider 42 by thin-film processing.

The read head 54 comprises a magnetic film 50 exhibiting the magnetoresistive effect and shielding films 52a and 52b disposed on the trailing and leading sides, respectively, of the magnetic film such that they sandwich the magnetic film between them. The respective lower ends of the magnetic film 50 and shielding films 52a and 52b are exposed in the ABS 43 of the slider 42.

The recording head 56 is located nearer to the trailing end 42b of the slider 42 than the read head 54. The recording head 56 comprises a main pole (record magnetic pole) 66, trailing shield (or shield magnetic pole) 68, recording coil 71, and a high-frequency oscillator, for example, a spin torque oscillator 74. The main pole 66 is formed of a high-saturation-magnetization material and produces a recording magnetic field perpendicular to the surfaces of the magnetic disk 12. The trailing shield 68 is opposed to the trailing side of the main pole 66 a gap (write gap). The recording coil 71 is located so that it is wound around the magnetic circuit including the main pole 66 and trailing shield 68 to pass magnetic flux to the main pole. The spin torque oscillator 74 is arranged between a distal end portion 66a of the main pole 66 on the side of the facing-surface 43 and the trailing shield 68, and is located at a portion facing the disk-facing surface 43.

The main magnetic pole 66 extends approximately perpendicularly with respect to the surface of the magnetic disk 12. The extreme end 66a of the magnetic disk 12 side of the main magnetic pole 66 is made slender toward the disk surface. The extreme end surface of the main magnetic pole 66 is exposed to the disk-facing surface 43 of the slider 42. In the embodiment, a width of the extreme end 66a of the main magnetic pole 66 approximately corresponds to a track width in the magnetic disk 12.

The trailing shield 68 is formed in an approximate U-shape with its extreme end 68a formed in a slender rectangular shape. An extreme end surface of the trailing shield 68 is exposed to the disk-facing surface 43 of the slider 42. The trailing shield 68 is disposed to efficiently close a magnetic path via the soft magnetic layer 23 just under the main magnetic pole 66. A leading side end surface of the extreme end 68a extends in a track width direction of the magnetic disk 12. The leading side end surface confronts a trailing side end surface of the main magnetic pole 66 approximately parallel thereto across a write gap WG. Note that side shields may be arranged on both sides of the main magnetic pole 66 in the track width direction. Since it becomes possible to reduce a fringe magnetic field to an adjacent track by disposing the side shields, the recording density in the track width direction can be improved.

The trailing shield 68 is coupled with the main magnetic pole 66 via a non-conductor 67, for example, $SiO_2$ and the like at a position away from the disk-facing surface 43. The main magnetic pole 66 is electrically insulated from the trailing shield 68 by the non-conductor 67.

The recording coil 71 is connected to a recording current control circuit 70. The recording current control circuit 70 supplies a recording current Iw to the recording coil 71 in response to a recording signal transmitted from the control circuit board 25 and from the substrate unit 17. With the operation, the recording coil 71 excites the main magnetic pole 66 and produces a recording magnetic field from the main magnetic pole 66.

As illustrated in FIG. 3, the spin torque oscillator 74 is interposed between the extreme end 66a of the main magnetic pole 66 and the leading side end surface of the trailing shield 68 and positioned in the write gap WG. Further, a lower end surface of the spin torque oscillator 74 is exposed to the disk-facing surface 43 of the slider and disposed at a position approximately as high as the extreme end surface of the main magnetic pole 66 with respect to the surface of the magnetic disk 12. That is, the lower end surface of the spin torque oscillator 74 is positioned flush with the disk-facing surface 43 of the slider 42 as well as approximately parallel to the surface of the magnetic disk 12.

The spin torque oscillator 74 is configured by sequentially laminating an underlayer formed of a nonmagnetic conductive layer, a spin injection layer (first magnetic body layer) 74a, an intermediate layer 74b, an oscillation layer (second magnetic body layer) 74c, and a cap layer formed of a nonmagnetic conductive layer from the main magnetic pole 66 side to the trailing shield 68 side. The underlayer is formed in contact with the extreme end 66a of the main magnetic pole 66 and further the cap layer is formed in contact with the leading side end surface of the trailing shield 68.

The oscillation layer 74c is formed of, for example, FeCoNi having a soft magnetic property as well as a large saturation magnetic flux density of 2T, and the intermediate layer 74b is formed of, for example, Cu having a long spin diffusion length. A spin injection layer 74a is formed of, for example, a Co/Ni artificial lattice having a high coercive force as well as a high spin polarization ratio. Further, the spin injection layer 74a may be form of a material having a coercive force larger than a gap magnetic field produced when writing. Note that although it is assumed that the spin injection layer 74a, the intermediate layer 74b, and the oscillation layer 74c are configured to be sequentially laminated from the main magnetic pole 66 side, the configuration is not limited thereto and a configuration for laminating the oscillation layer, the intermediate layer, and spin injection layer in the order from the main magnetic pole 66 side may be employed.

The spin torque oscillator 74 is connected to a spin torque oscillator (STO) drive current control circuit 80 via the main magnetic pole 66 and the trailing shield. The STO drive current control circuit 80 is connected to a power supply 82. Then, the STO drive current control circuit 80 supplies a drive current Isto in series via the main magnetic pole 66, the spin torque oscillator 74, and the trailing shield 68 by applying a voltage from the power supply 82 to the main magnetic pole 66 and the trailing shield 68 under the control of the control circuit board 25. That is, the STO drive current control circuit 80 supplies a direct current to the spin torque oscillator 74 in a film thickness direction of the spin torque oscillator 74. Since a magnetization of the oscillation layer 74c of the spin torque oscillator 74 is rotated by supplying the direct current, a high-frequency magnetic field can be produced. With the operation, the spin torque oscillator 74 applies a high-frequency magnetic field to a recording layer of the magnetic disk 12.

The STO drive current control circuit 80 includes a constant current supply circuit 84 for supplying a constant current to the spin torque oscillator 74 and an inverted current supply circuit 86 for supplying an inverted current having a polarity different from the constant current to the spin torque oscillator 74 and inverting a magnetization direction of the spin injection layer 74c of the spin torque oscillator 74. The constant current supply circuit 84 supplies the constant current to the spin torque oscillator 74 in synchronization with the recording current Iw supplied from the recording current control circuit 70 and further the inverted current supply circuit 86 supplies an inverted current to the spin torque oscillator 74 in synchronization with polarity inversion of the recording current Iw.

Figure 4:
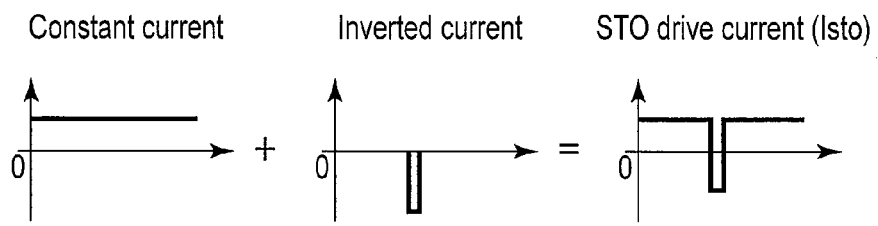
FIG. 4 is a view schematically illustrating a current supplied to a spin torque oscillator of a magnetic recording head.

FIG. 4 shows a method of supplying the drive current Isto executed by the STO drive current control circuit 80. As illustrated in the drawing, the STO drive current control circuit 80 is configured to control a time in which the constant current is supplied from the constant current supply circuit 84 and a timing at which the inverted current, which has a polarity inverted from that of the constant current, is supplied pulsewise in a short time from the inverted current supply circuit 86 during writing by the magnetic recording head 56.

According to the HDD and magnetic recording head configured as described above, a magnetization direction of the spin injection layer 74a can be changed by a current without depending on a gap magnetic field of the recording head by supplying the inverted current to the spin torque oscillator 74. That is, magnetization reversal of the spin injection layer can be executed by a current using the spin injection magnetization reversal effect. Accordingly, even a spin injection layer material having a coercive force larger than a gap magnetic field can be used. Then, since a magnetization of the spin injection layer is stabilized by using a spin injection layer having a large coercive force, a high-frequency assist write can be executed more stably and reliably. Further, since responsiveness is improved without depending on the gap magnetic field by inverting the magnetization of the spin injection layer by the inverted current, it becomes possible to write at high speed.

From what has been described above, according to the embodiment, a magnetic recording head capable of recording more stably at a higher speed and a disk apparatus including the same can be obtained.

Next, a magnetic head of a HDD according to other embodiment will be explained. Note that in the other embodiment explained below, the same portions as those of first embodiment described above are denoted by the same reference symbols, with their detailed explanation omitted, and the portions different from those of the first embodiment will be mainly described in detail.

(Second Embodiment)

FIG. 5 is a view illustrating an energization control method of a recording current Iw and a STO drive current Isto in an HDD according to a second embodiment. According to the embodiment, a constant current supply circuit 84 of an STO drive current control circuit 80 supplies a constant current in synchronization with the recording current Iw as well as an inverted current supply circuit 86 supplies an inverted current having a different polarity to a spin torque oscillator 74 to which the constant current is supplied pulsewise, that is, in only a short time in agreement with a timing at which a polarity of the recording current Iw is inverted.

FIG. 6 shows a magnetization state of an oscillation layer 74c and a magnetization state of a spin injection layer 74a of the spin torque oscillator 74 corresponding to energization types (1) to (5) of FIG. 5. As shown in FIG. 5 and FIG. 6, the magnetization state of the oscillation layer 74c and a magnetization direction of the spin injection layer 74a are changed by supplying the inverted current in agreement with the change of the polarity of the recording current Iw.

Further, as illustrated in FIG. 7, in the embodiment, the inverted current supply circuit 86 is configured to supply the inverted current to the spin torque oscillator 74 during a period from a time at which an absolute value of the recording current Iw starts to become low until a time at which the absolute value becomes zero, that is, a period from a time at which the recording current Iw starts to rise until the recording current Iw becomes zero or a period from a time at which the recording current Iw starts to fall until a time at which the recording current Iw becomes zero when the polarity of the recording current Iw is inverted. As described above, when the pulsewise inverted current having the inverted polarity is applied to the spin torque oscillator 74, first, the magnetization direction of the spin injection layer 74a is inverted, and then the magnetization of the oscillation layer 74c is promptly inverted and starts to rotate in agreement with the rising or the falling of the recording current Iw.

Figure 8:
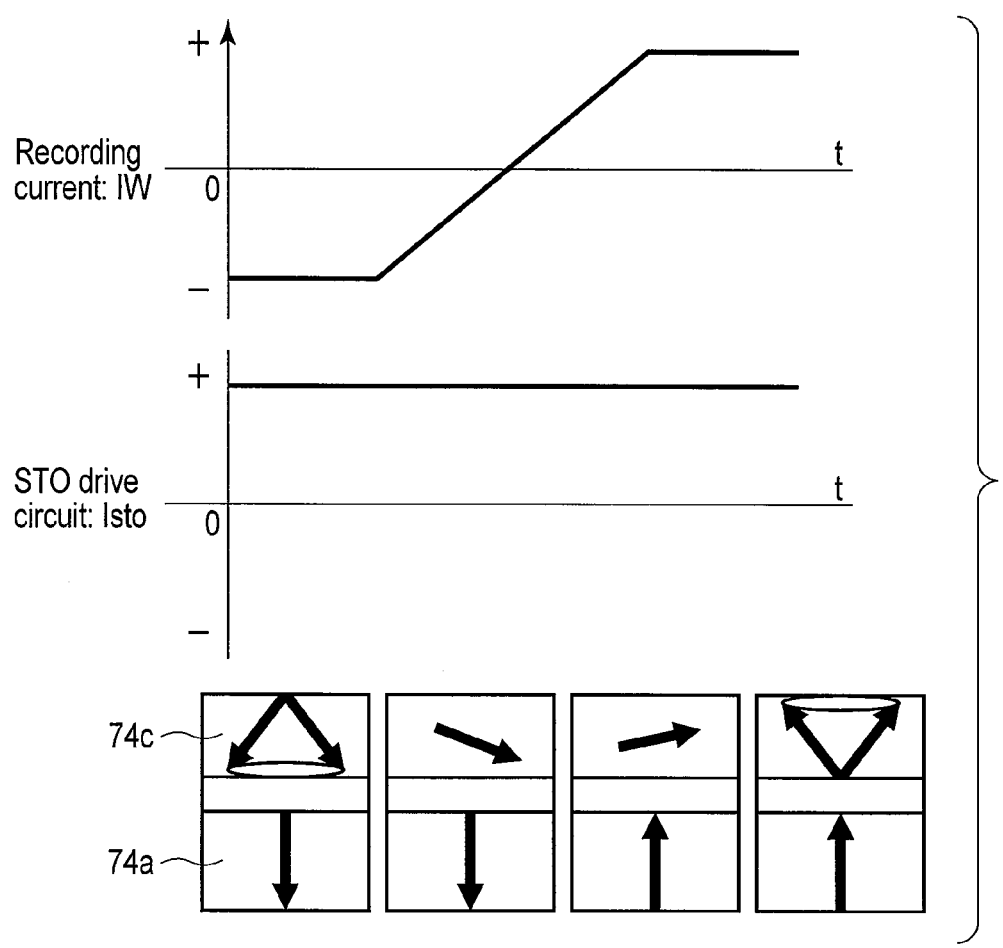
FIG. 8 is a view illustrating a recording current of a recording head and a drive current of a spin torque oscillator according to a comparative example in comparison with a magnetization direction in a spin injection layer and an oscillation layer.

In contrast, FIG. 8 illustrates, as an comparative example, a recording current, an STO drive current, a magnetization state of an oscillation layer and a magnetization state of a spin injection layer of a spin torque oscillator when a pulsewise inverted current having an inverted polarity is not applied and only a constant current is caused to continuously flow to the spin torque oscillator. In an energization control method according to the comparative example, a magnetization direction of a spin injection layer 74a is inverted after a polarity of the recording current is inverted. Accordingly, it can be understood that a magnetization of an oscillation layer 74c is inverted and starts to rotate later as compared with the energization control method of the embodiment.

As described above, according to the second embodiment, the magnetization state of the oscillation layer and the magnetization state of the spin injection layer can be inverted at high speed by supplying the inverted current to the spin torque oscillator in synchronization with the polarity inversion of the recording current, thereby responsiveness of the magnetization reversal can be improved. Accordingly, since the magnetization reversal of the spin injection layer can be executed without delaying the inversion of the recording magnetic field, recording can be executed at high speed. Further, the magnetization reversal of the spin injection layer can be executed by a current using the spin injection magnetization reversal effect. Accordingly, even a spin injection layer material having a coercive force larger than a gap magnetic field can be used. The magnetization of the spin injection layer is stabilized and a high-frequency assist recording can be executed more stably and reliably by using a spin injection layer having a large coercive force.

From what has been described above, according to the embodiment, there can be provided a magnetic recording head capable of stable recording at a higher speed and a disk apparatus including the magnetic recording head.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the high-frequency oscillator is not limited to be disposed to the trailing side of the main magnetic pole and may be disposed to the leading side of the main magnetic pole.

What is claimed is:

1. A magnetic recording head comprising:
a main magnetic pole configured to apply a recording magnetic field;
a spin torque oscillator adjacent to the main magnetic pole in a vicinity of a disk-facing surface;
a recording coil configured to excite the main magnetic pole;
a recording current control circuit configured to supply a recording current to the recording coil;
a constant current supply circuit configured to supply a constant current to the spin torque oscillator; and
an inverted current supply circuit configured to supply an inverted pulse waveform current having a polarity different from the constant current to the spin torque oscillator, wherein a pulse width of the inverted pulse waveform is shorter than a half cycle of the recording current.

2. The magnetic recording head of claim 1, wherein the inverted current supply circuit is configured to supply the inverted current to the spin torque oscillator in synchronization with a polarity inversion of the recording current.

3. The magnetic recording head of claim 2, wherein the inverted current supply circuit is configured to supply the inverted current to the spin torque oscillator during a period from a time at which the recording current starts to rise until a time at which the recording current becomes zero, or a period from a time at which the recording current starts to fall until a time at which the recording current becomes zero when the polarity of the recording current is inverted.

4. The magnetic recording head of claim 3, wherein the magnetic recording head comprises a shield magnetic pole opposed to the main magnetic pole with a gap; and
the spin torque oscillator is between the main magnetic pole and the shield magnetic pole in the gap.

5. The magnetic recording head of claim 4, wherein the spin torque oscillator comprises a spin injection layer and an oscillation layer, and the spin injection layer is formed of a magnetic material having a coercive force larger than a gap magnetic field produced between the main magnetic pole and the shield magnetic pole when recording.

6. The magnetic recording head of claim 1, wherein the inverted current supply circuit is configured to supply the inverted current to the spin torque oscillator during a period from a time at which an absolute value of the recording current starts to become low to a time at which the absolute value of the recording current becomes zero.

7. The magnetic recording head of claim 1, wherein the magnetic recording head comprises a shield magnetic pole opposed to the main magnetic pole with a gap; and the spin torque oscillator is between the main magnetic pole and the shield magnetic pole in the gap.

8. The magnetic recording head of claim 2, wherein the magnetic recording head comprises a shield magnetic pole opposed to the main magnetic pole with a gap; and the spin torque oscillator is between the main magnetic pole and the shield magnetic pole in the gap.

9. A disk apparatus comprising:

a disk-shaped recording medium comprising a recording layer;

a drive unit configured to support and rotate the recording medium; and a magnetic recording head of claim 1 configured to execute data processing on the recording medium.

\* \* \* \* \*